(12) United States Patent
Shpunt et al.

(10) Patent No.: US 9,267,787 B2
(45) Date of Patent: Feb. 23, 2016

(54) DEPTH SCANNING WITH MULTIPLE EMITTERS

(71) Applicant: Apple Inc., Cupertino, CA (US)

(72) Inventors: Alexander Shpunt, Tel Aviv (IL); Ronen Einat, Shoham (IL); Zafrir Mor, Ein Habsor (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/207,701

(22) Filed: Mar. 13, 2014

(65) Prior Publication Data

US 2014/0313519 A1    Oct. 23, 2014

Related U.S. Application Data

(60) Provisional application No. 61/786,711, filed on Mar. 15, 2013.

(51) Int. Cl.
| | |
|---|---|
| *G01B 11/25* | (2006.01) |
| *G01B 11/24* | (2006.01) |
| *G01S 17/46* | (2006.01) |
| *G01S 17/89* | (2006.01) |
| *G01S 7/481* | (2006.01) |

(52) U.S. Cl.
CPC ............ *G01B 11/24* (2013.01); *G01S 7/4815* (2013.01); *G01S 17/46* (2013.01); *G01S 17/89* (2013.01)

(58) Field of Classification Search
CPC ...... G01J 1/0477; G01J 1/0429; G06T 15/00; G06T 17/00; G01B 11/2518; G01B 11/24; G01B 11/2513

USPC ......... 356/601–623, 4.01, 5.01, 5.1; 345/419, 345/156

See application file for complete search history.

(56) References Cited

U.S. PATENT DOCUMENTS

| | | | |
|---|---|---|---|
| 7,248,344 B2 * | 7/2007 | Morcom | ........................ 356/10 |
| 7,952,781 B2 | 5/2011 | Weiss et al. | |
| 8,018,579 B1 | 9/2011 | Krah | |
| 8,353,457 B2 | 1/2013 | Olmstead | |
| 8,508,676 B2 | 8/2013 | Silverstein et al. | |
| 2002/0071169 A1 | 6/2002 | Bowers et al. | |

(Continued)

FOREIGN PATENT DOCUMENTS

| | | |
|---|---|---|
| WO | 02/082016 A1 | 10/2002 |
| WO | 2012150590 A1 | 11/2012 |

OTHER PUBLICATIONS

International Application # PCT/IB2014/059711 Search Report dated Sep. 1, 2014.

(Continued)

*Primary Examiner* — Hoa Pham
(74) *Attorney, Agent, or Firm* — D. Kligler I.P. Services Ltd.

(57) ABSTRACT

Mapping apparatus includes a transmitter, which is configured to emit, in alternation, at least two beams comprising pulses of light along respective beam axes that are mutually offset transversely relative to a scan line direction of a raster pattern. A scanner is configured to scan the two or more beams in the raster pattern over a scene. A receiver is configured to receive the light reflected from the scene and to generate an output indicative of a time of flight of the pulses to and from points in the scene. A processor is coupled to process the output of the receiver so as to generate a 3D map of the scene.

17 Claims, 6 Drawing Sheets

(56) References Cited

U.S. PATENT DOCUMENTS

| | | |
|---|---|---|
| 2003/0090818 A1 | 5/2003 | Wittenberger |
| 2003/0227614 A1 | 12/2003 | Taminiau et al. |
| 2005/0024701 A1 | 2/2005 | Cannon et al. |
| 2005/0110157 A1 | 5/2005 | Sherrer et al. |
| 2007/0221826 A1 | 9/2007 | Bechtel et al. |
| 2007/0279722 A1 | 12/2007 | Yavid et al. |
| 2008/0278566 A1 | 11/2008 | Towner et al. |
| 2009/0141192 A1 | 6/2009 | Nojima |
| 2010/0142020 A1 | 6/2010 | Kim |
| 2011/0188054 A1 | 8/2011 | Petronius et al. |
| 2011/0228251 A1* | 9/2011 | Yee et al. ............. 356/5.01 |
| 2011/0254928 A1 | 10/2011 | Meinherz |
| 2011/0279648 A1 | 11/2011 | Lutian et al. |
| 2011/0310125 A1 | 12/2011 | McEldowney et al. |
| 2012/0074296 A1* | 3/2012 | Hammes et al. ........ 250/205 |
| 2012/0182392 A1* | 7/2012 | Kearns et al. ............. 348/46 |
| 2012/0236379 A1 | 9/2012 | Da Silva et al. |
| 2013/0127854 A1* | 5/2013 | Shpunt .......... G06T 17/00 345/420 |
| 2013/0207970 A1 | 8/2013 | Shpunt et al. |
| 2013/0250387 A1* | 9/2013 | Chayat et al. ........ 359/212.2 |
| 2014/0225824 A1* | 8/2014 | Shpunt et al. .......... 345/156 |
| 2014/0291496 A1* | 10/2014 | Shpunt ........ G01J 1/0477 250/225 |
| 2015/0120057 A1* | 4/2015 | Wong et al. ............... 700/259 |

OTHER PUBLICATIONS

Sick AG, "MiniFaros: Low-cost Miniature Laserscanner for Environment Perception", Presentation at 15th International Forum on Advanced Microsystems for Automotive Applications (AMAA 2011), 17 pages, Berlin, Germany, 2011.

U.S. Appl. No. 13/766,801 Office Action Dated Jul. 16, 2015.

* cited by examiner

DEPTH SCANNING WITH MULTIPLE EMITTERS

CROSS-REFERENCE TO RELATED APPLICATION

This application claims the benefit of U.S. Provisional Patent Application 61/786,711, filed Mar. 15, 2013, which is incorporated herein by reference.

FIELD OF THE INVENTION

The present invention relates generally to methods and devices for projection and capture of optical radiation, and particularly to optical 3D mapping.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

U.S. Patent Application Publication 2011/0279648 describes a method for constructing a 3D representation of a subject, which comprises capturing, with a camera, a 2D image of the subject. The method further comprises scanning a modulated illumination beam over the subject to illuminate, one at a time, a plurality of target regions of the subject, and measuring a modulation aspect of light from the illumination beam reflected from each of the target regions. A moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

U.S. Pat. No. 8,018,579 describes a three-dimensional imaging and display system in which user input is optically detected in an imaging volume by measuring the path length of an amplitude modulated scanning beam as a function of the phase shift thereof. Visual image user feedback concerning the detected user input is presented.

U.S. Pat. No. 7,952,781, whose disclosure is incorporated herein by reference, describes a method of scanning a light beam and a method of manufacturing a microelectromechanical system (MEMS), which can be incorporated in a scanning device.

U.S. Patent Application Publication 2012/0236379 describes a LADAR system that uses MEMS scanning. A scanning mirror includes a substrate that is patterned to include a mirror area, a frame around the mirror area, and a base around the frame. A set of actuators operate to rotate the mirror area about a first axis relative to the frame, and a second set of actuators rotate the frame about a second axis relative to the base. The scanning mirror can be fabricated using semiconductor processing techniques. Drivers for the scanning mirror may employ feedback loops that operate the mirror for triangular motions. Some embodiments of the scanning mirror can be used in a LADAR system for a Natural User Interface of a computing system.

The "MiniFaros" consortium, coordinated by SICK AG (Hamburg, Germany) has supported work on a new laser scanner for automotive applications. Further details are available on the minifaros.eu Web site.

SUMMARY

Embodiments of the present invention that are described hereinbelow provide improved apparatus and methods for depth mapping using a scanning beam.

There is therefore provided, in accordance with an embodiment of the present invention, mapping apparatus, which includes a transmitter, which is configured to emit, in alternation, at least two beams including pulses of light along respective beam axes that are mutually offset transversely relative to a scan line direction of a raster pattern. A scanner is configured to scan the two or more beams in the raster pattern over a scene. A receiver is configured to receive the light reflected from the scene and to generate an output indicative of a time of flight of the pulses to and from points in the scene. A processor is coupled to process the output of the receiver so as to generate a 3D map of the scene.

In some embodiments, the scanner includes a rotating mirror, which is configured to rotate so as to generate the raster pattern, and the transmitter is configured to direct the at least two beams to reflect from the mirror in alternation as the mirror scans over the raster pattern. Typically, the receiver includes a detector, which is configured to receive the reflected light from the scene via the mirror as the mirror rotates. The detector has a detection area, which is scanned over the scene by the rotation of the mirror, and the at least two beams may have respective emission areas that are scanned over the scene by the rotation of the mirror and, at any given location along the raster pattern, fall within the detection area.

Additionally or alternatively, the apparatus includes a beamsplitter, which is positioned so as to direct the beams emitted by the transmitter toward the mirror, while permitting the reflected light to reach the detector, wherein the beam axes and an optical axis of the reflected light are parallel between the beamsplitter and the micromirror.

In some embodiments, the transmitter includes at least two emitters, which are respectively configured to emit the at least two beams and are mounted on a substrate in respective positions that are offset transversely relative to a projection of the scan line direction onto the substrate. In one embodiment, the transmitter includes an edge-emitting laser die containing an array of two or more parallel laser stripes, which serve as the at least two emitters. In another embodiment, the transmitter includes a vertically-emitting laser die containing an array of two or more vertical-cavity surface-emitting lasers (VCSELs), which serve as the at least two emitters. In a disclosed embodiment, the transmitter includes optics, including an array of at least two microlenses, which are respectively aligned with the at least two emitters so that the optics reduce an angular separation between the beam axes. The respective positions of the at least two emitters may be diagonally offset relative to the projection of the scan line direction onto the substrate.

There is also provided, in accordance with an embodiment of the present invention, a method for mapping, which includes emitting, in alternation, at least two beams including pulses of light along respective beam axes that are mutually offset transversely relative to a scan line direction of a raster pattern. The two or more beams are scanned in the raster pattern over a scene. The light reflected from the scene is received, and responsively to the received light, an output is generated, which is indicative of a time of flight of the pulses to and from points in the scene. The output is processed so as to generate a 3D map of the scene.

The present invention will be more fully understood from the following detailed description of the embodiments thereof, taken together with the drawings in which:

DETAILED DESCRIPTION OF EMBODIMENTS

Overview

U.S. Patent Application 2013/0207970, which is assigned to the assignee of the present patent application and whose disclosure is incorporated herein by reference, describes depth engines that generate 3D mapping data by measuring the time of flight of a scanning beam. A light transmitter, such as a laser, directs short pulses of light toward a scanning mirror, which scans the light beam over a scene of interest within a certain scan range. A receiver, such as a sensitive, high-speed photodiode (for example, an avalanche photodiode) receives light returned from the scene via the same scanning mirror. Processing circuitry measures the time delay between the transmitted and received light pulses at each point in the scan. This delay is indicative of the distance traveled by the light beam, and hence of the depth of the object at the point. The processing circuitry uses the depth data thus extracted in producing a 3D map of the scene.

In the system described in the above-mentioned patent application (and in other systems that operate on similar principles), the light beam, along with the detection area of the receiver, is scanned over the scene in a raster pattern. The scan resolution can be increased by decreasing the angular separation between successive raster lines, but this sort of resolution increase will come at the expense of reduced frame rate, since a larger number of raster lines is required to cover the scene. Alternatively, the resolution may be increased at the expense of reduced field of view if the number of raster lines per frame is unchanged. Mechanical constraints put a limit on the degree to which the scanning speed of the mirror can be increased in order to offset these effects.

Embodiments of the present invention that are described hereinbelow address these limitations by multiplexing two (or more) scanning spots, which are mutually offset in angle, along each raster line of the scan. In the disclosed embodiments, a transmitter emits at least two pulsed beams in alternation. The respective axes of these beams are mutually offset (in angle) transversely relative to the scan line direction of the raster. A scanner, such as a moving mirror, scans the two or more beams in the raster pattern over a scene, thus generating, in effect, two or more parallel scan lines that are parallel to each raster line. A receiver receives the light reflected from the scene and generates an output indicative of the time of flight of the pulses to and from points in the scene, which can then be used to create a 3D map of the scene.

Thus, embodiments of the present invention effectively multiply the scan resolution of a depth mapping system by two or more, depending on the number of emitters that are used. The emitters may comprise, for example, diode lasers or other solid-state sources, which can be pulsed on and off rapidly in turn, and thus multiply the density of spots that are sensed by the receiver within a given time without requiring any increase in the speed of the scanner itself. The optimal rate and pattern of pulsing the emitters may be selected on the basis of the scan rate and the desired pixel resolution of the depth map.

In the disclosed embodiments, the scanner comprises a mirror, which oscillates (i.e., rotates about two perpendicular axes) as to generate the raster pattern. The beams from the transmitter reflect from the mirror in alternation as the mirror scans over the raster pattern. Typically, the receiver comprises a detector, which receives the reflected light from the scene via the mirror, as well. The components can be chosen and designed so that the detection area of the detector, which is scanned over the scene by the rotation of the mirror, is large enough, in angular terms, so that the emission areas of all the transmitted beams at any given location along the raster pattern fall within the detection area.

The two (or more) pulsed beams may be generated by respective emitters, which are mounted on a substrate in respective positions that are offset transversely relative to a projection of the scan line direction onto the substrate. The transmitter may comprise, for example, an edge-emitting laser die containing an array of two or more parallel laser stripes, which serve as the emitters, or an array of two or more vertical-cavity surface-emitting lasers (VCSELs), or possible, for high optical power, two- or more individually-addressable groups of VCSELs.

The angular separation between the emitted beams depends on the relative offset between the emitters on the substrate and on the optics that are used in projecting the beams. In general, technological constraints dictate a certain minimal offset between the emitters (or groups of emitters in case of VCSEL arrays), which in turn places a lower limit on the angular separation of the beams in the far field. This angular separation determines the density of scan spots and may limit the resolution that can be achieved between the pixels in the 3D map.

Some of the embodiments that are described hereinbelow provide means for reducing the angular separation between the beams, and thus enhancing the resolution. In some embodiments, the transmitter optics comprise an array of microlenses that are respectively aligned with the emitters and are configured to reduce the angular separation between the beam axes. In other embodiments, the respective positions of the emitters are diagonally offset relative to the projection of the scan line direction onto the substrate. As a result, the effective angular separation between the beams, measured in the key direction perpendicular to the scan line, is reduced even though the actual angular separation is unchanged.

System Description

Figure 1:
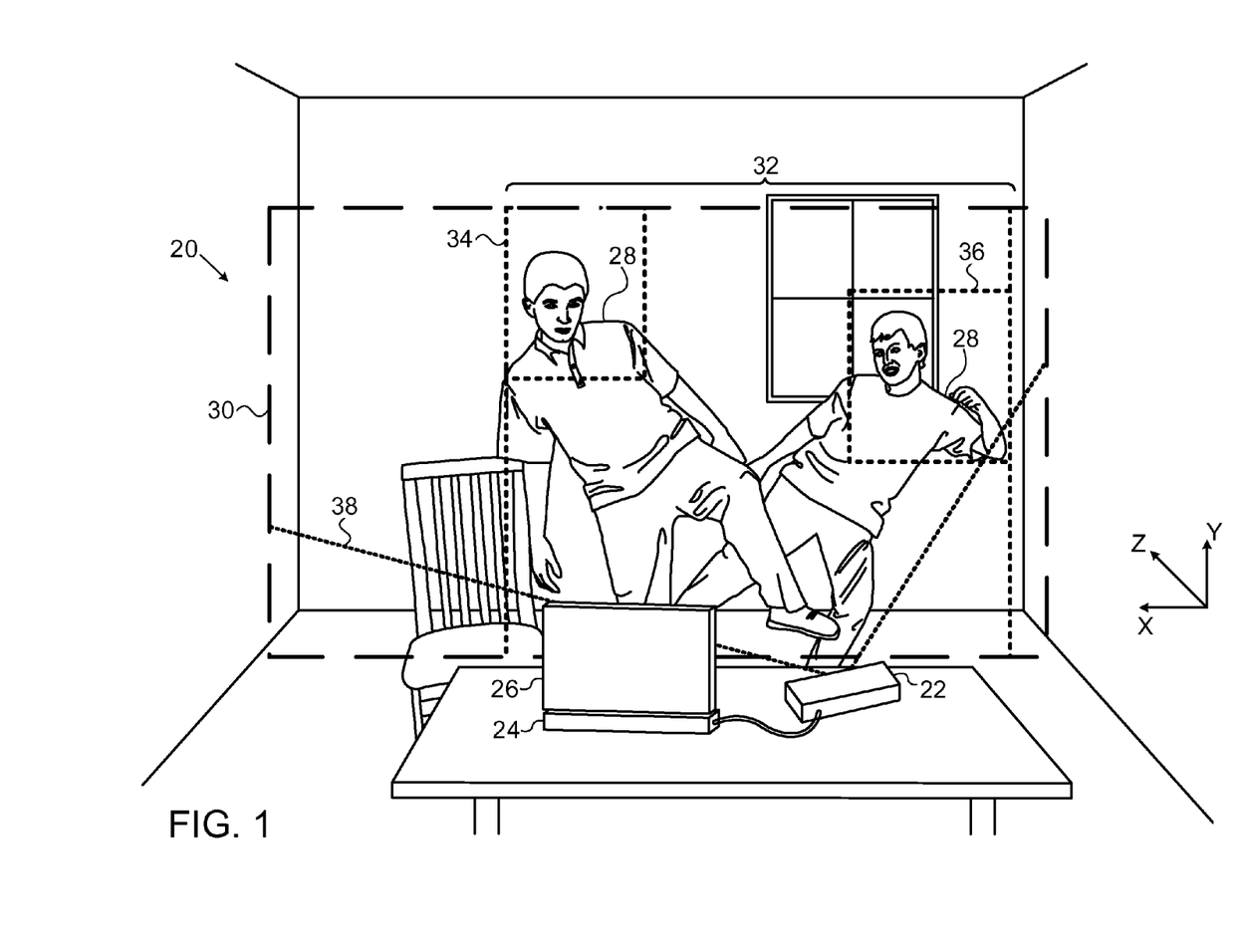
FIG. 1 is a schematic, pictorial illustration of a depth mapping system, in accordance with an embodiment of the present invention.

FIG. 1 is a schematic, pictorial illustration of a depth mapping system 20, in accordance with an embodiment of the present invention. The system is based on a scanning depth engine 22, which captures 3D information in a volume of interest (VOI) 30 in a scene that includes one or more objects. In this example, the objects comprise at least parts of the bodies of users 28 of the system. Engine 22 outputs a sequence of frames containing depth data to a computer 24, which processes and extracts high-level information from the data. This high-level information may be provided, for example, to an application running on computer 24, which drives a display screen 26 accordingly.

Computer 24 processes data generated by engine 22 in order to reconstruct a depth map of VOI 30 containing users 28. In one embodiment, engine 22 emits pulses of light while scanning over the scene and measures the relative delay of the pulses reflected back from the scene. A processor in engine 22 or in computer 24 then computes the 3D coordinates of points in the scene (including points on the surface of the users' bodies) based on the time of flight of the light pulses at each measured point (X,Y) in the scene. This approach is advantageous in that it does not require the users to hold or wear any sort of beacon, sensor, or other marker. It gives the depth (Z) coordinates of points in the scene relative to the location of engine 22 and permits dynamic zooming and shift of the region that is scanned within the scene. Implementation and operation of the depth engine are described in greater detail hereinbelow.

Although computer 24 is shown in FIG. 1, by way of example, as a separate unit from depth engine 22, some or all of the processing functions of the computer may be performed by a suitable microprocessor and software or by dedicated circuitry within the housing of the depth engine or otherwise associated with the depth engine. As another alternative, at least some of these processing functions may be carried out by a suitable processor that is integrated with display screen 26 (in a television set, for example) or with any other suitable sort of computerized device, such as a game console or media player. The sensing functions of engine 22 may likewise be integrated into computer 24 or other computerized apparatus that is to be controlled by the depth output.

For simplicity and clarity in the description that follows, a set of Cartesian axes is marked in FIG. 1. The Z-axis is taken to be parallel to the optical axis of depth engine 22. The frontal plane of the depth engine is taken to be the X-Y plane, with the X-axis as the horizontal. These axes, however, are defined solely for the sake of convenience. By the same token, the terms "vertical" and "horizontal" are used herein in describing the operation of depth engine 22 solely for the sake of clarity of explanation, to correspond to the example implementation that is shown in FIG. 1, and not by way of limitation, since the depth engine could equally operate at a rotation of 90° relative to the pictured view. Other geometrical configurations of the depth engine and its volume of interest may alternatively be used and are considered to be within the scope of the present invention.

As described in greater detail hereinbelow, engine 22 generates two or more beams 38, which scan VOI 30 in a raster pattern. For example, the depth engine may scan rapidly in the Y-direction, in a resonant scan of a scanning mirror with a fixed frequency, such as 1-10 kHz, while scanning more slowly in the X-direction at the desired frame rate (such as 1-100 Hz, which is typically not a resonant frequency of rotation). The scanning rate is generally a limiting factor in the resolution of the scan, since the number of Y-direction scan lines that can be traversed in each frame is limited by the resonant mirror frequency, regardless of the rate and range of the X-direction scan. Embodiments of the present invention that are described herein increase the achievable resolution by using multiple emitters in engine 22 to generate and scan multiple parallel raster lines concurrently in each scan of the mirror.

The range of the scan pattern of engine 22 may be adjusted during operation of system 20, as described in the above-mentioned U.S. patent application Ser. No. 13/766,801, For example, the scan may be limited to a window 32, or the scan range may be controlled to focus on respective windows 34, 36 over users 28 while skipping over the space between them. These zoom capabilities enable enhanced resolution within the selected windows.

Figure 2:
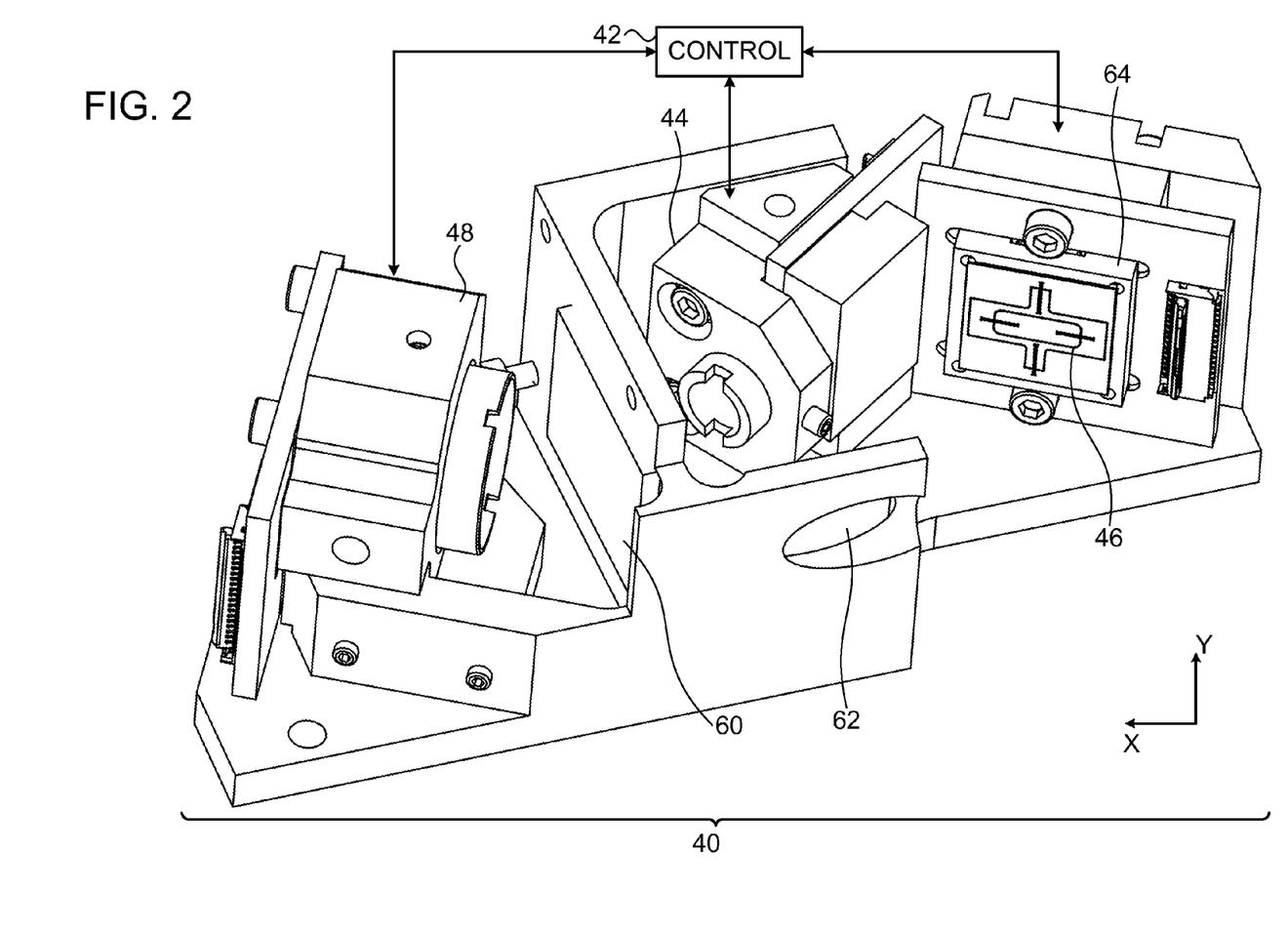
FIG. 2 is a schematic, pictorial illustration of an optical scanning head, in accordance with an embodiment of the present invention.

FIG. 2 is a schematic, pictorial illustration showing elements of an optical scanning head 40 that may be used in depth engine 22, in accordance with an embodiment of the present invention. A transmitter 44 emits pulses of light toward a polarizing beamsplitter 60. As explained in detail hereinbelow, the transmitter comprises multiple emitters, which emit respective beams of light along axes that are mutually offset. These beams may comprise visible, infrared, and/or ultraviolet radiation (all of which are referred to as "light" in the context of the present description and in the claims). Typically, only a small area of the beamsplitter, directly in the light path of transmitter 60, is coated for reflection, while the remainder of the beamsplitter is fully transparent (or even anti-reflection coated) to permit returned light to pass through to a receiver 48.

The light from transmitter 44 reflects off beamsplitter 60 and is then directed by a folding mirror 62 toward a scanning micromirror 46. A MEMS scanner 64 scans micromirror 46 in X- and Y-directions with the desired scan frequency and amplitude. The micromirror scans beams 38 over the scene, typically via projection/collection optics, such as a suitable lens (not shown in the figures). Details of the micromirror and scanner are described in the above-mentioned U.S. patent application Ser. No. 13/766,801, and techniques that may be used in producing these elements are described in the above-mentioned U.S. Pat. No. 7,952,781. In alternative embodiments (not shown), separate mirrors may be used for the X- and Y-direction scans, and other types of scanners—not necessarily MEMS-based—as are known in the art, may be used.

Light pulses returned from the scene strike micromirror 46, which reflects the light via turning mirror 62 through beamsplitter 60. The optical axes of the transmitted beams and the reflected light are parallel between beamsplitter 60 and mirror 62. (Alternatively, in place of a single mirror shared by the transmitter and the receiver, a pair of synchronized mirrors may be used, one for the transmitter and the other for the receiver, while still supporting the capabilities of engine 22 that are described herein.) Receiver 48 senses the returned light pulses and generates corresponding electrical pulses.

Receiver 48 typically comprises a sensitive, high-speed photodetector, such as an avalanche photodiode (APD), along with a sensitive amplifier, such as a transimpedance amplifier (TIA), which amplifies the electrical pulses output by the photodetector. These pulses are indicative of the times of flight of the corresponding pulses of light. Typically, given an APD with a sensing area that is between 0.01 and 1 mm across, and a collecting lens in the receiver of focal length in the range of 1-10 mm, receiver 48 has a collection angle of about 0.5-10°. The pulses that are output by receiver 48 are processed by a controller 42 (or by computer 24) in order to extract depth (Z) values as a function of scan location (X,Y). The data from engine 40 may be output to computer 24 via a suitable interface.

To enhance sensitivity of detection, the overall area of beamsplitter 60 and the aperture of receiver 48 are considerably larger than the area of the transmitted beams. Beamsplitter 60 may be accordingly patterned, i.e., the reflective coating extends over only the part of its surface on which the transmitted beam is incident. The reverse side of the beamsplitter may have a bandpass coating, to prevent light outside the emission band of transmitter 44 from reaching the receiver. It is also desirable that micromirror 46 be as large as possible, within the inertial constraints imposed by the scanner. For example, the area of the micromirror may be about 5-50 mm$^2$.

Controller 42 coordinates the timing of the pulses emitted by transmitter 44 and of the scan pattern of micromirror 46. Specifically, the controller causes the multiple emitters in the transmitter to emit their respective pulses in alternation, so that each scan line generated by micromirror 46 actually traces two or more parallel scan lines, spaced a small distance apart, across VOI 30 (as shown below in FIG. 5). The alternating pulse operation may be such as to cause each emitter to emit a single pulse in its turn, followed by the pulse from the next emitter; or it may alternatively generate more complex patterns, such as emission of two or more successive pulses by a given emitter, followed by two or more pulses from the next emitter, and so forth.

The specific mechanical and optical designs of the optical head shown in FIG. 2 are described here by way of example, and alternative designs implementing similar principles are considered to be within the scope of the present invention. For example, optoelectronic module designs that are described in the above-mentioned U.S. Patent Application Publication 2013/0207970 may be adapted for multi-emitter operation. As another example, a single emitter with an acousto-optic or electro-optic modulator in the transmit path between the transmitter and the beamsplitter could be used to generate multiple, alternating spots at a mutual offset. The modulator changes the pointing angle of the transmitted beam by a small predefined amount (for example, by the inter-pixel separation of 1-10 mrad), which does not shift the beam significantly on the mirror.

Multi-Emitter Designs

Figure 3A:
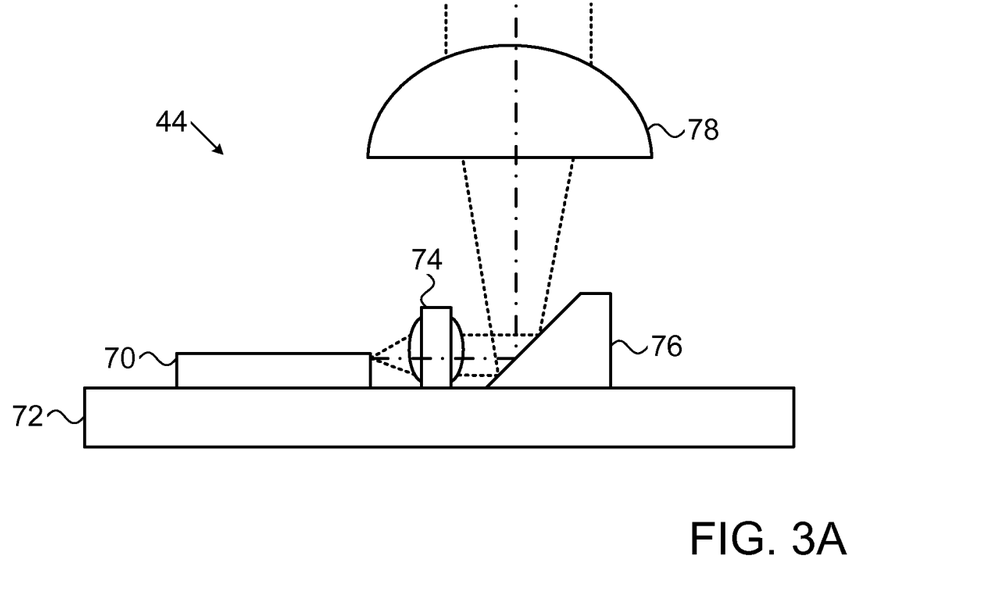
FIGS. 3A and 3B are schematic side and top views of an optoelectronic emitter module, in accordance with an embodiment of the present invention.
Figure 3B:
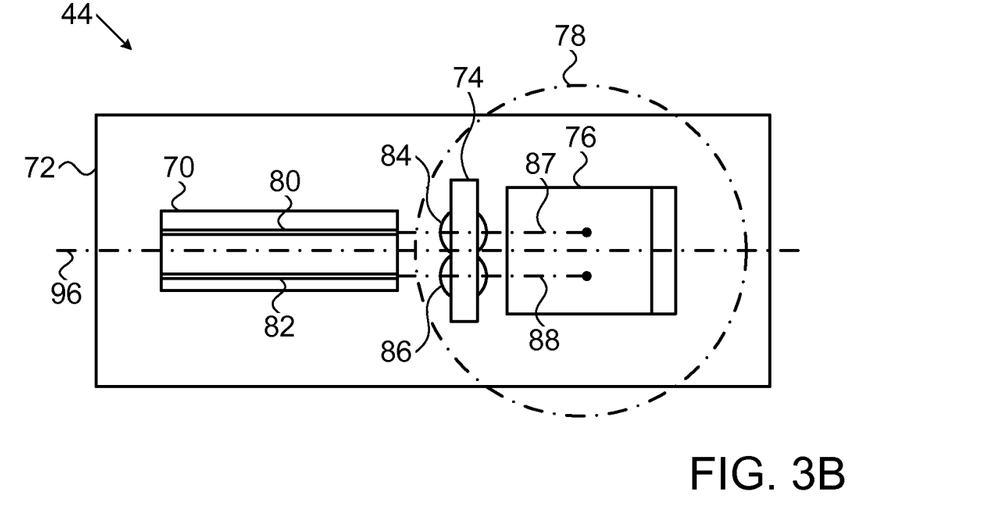

FIGS. 3A and 3B are schematic side and top views, respectively of an optoelectronic emitter module used in transmitter 44, in accordance with an embodiment of the present invention. A laser die 70 is mounted on a suitable substrate 72, such as a silicon optical bench (SiOB). Laser die 70 in this embodiment is an edge-emitting device, containing an array of two parallel laser stripes 80, 82. (In other embodiments, not shown in the figures, the array may contain a larger number of stripes; or surface-emitting devices may be used, as shown in FIGS. 7B-C.

Figure 5:
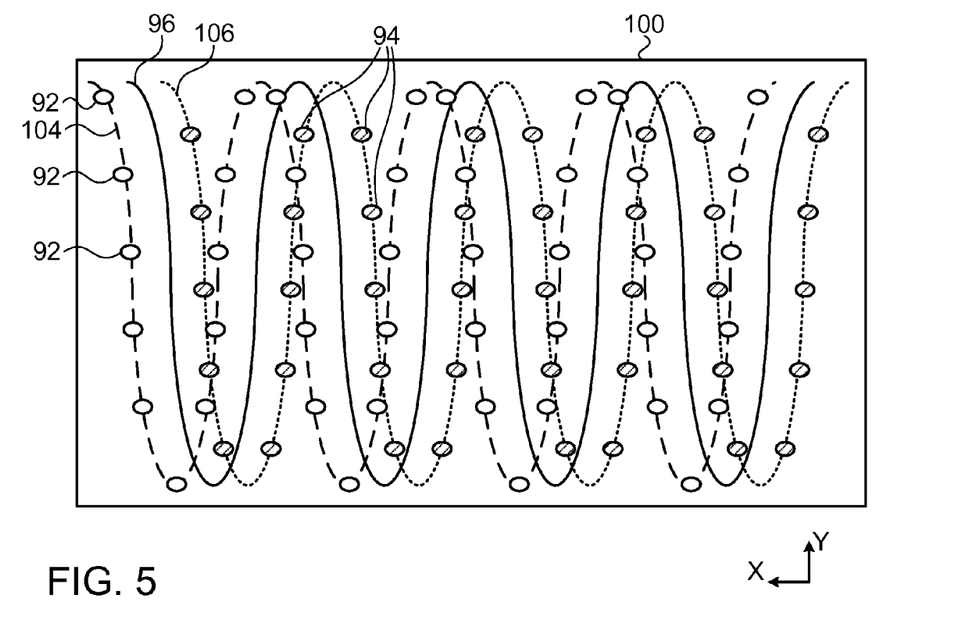
FIG. 5 is a schematic representation of a scan pattern of an optical scan head, in accordance with an embodiment of the present invention.

Stripes 80 and 82 are offset transversely relative to the projection of a scan line 96 of optical scanning head 40 onto substrate 72. (The projection of the scan line is defined by imaging successive points along the scan line from VOI 30 back onto the substrate. The scan lines in the raster, as shown in FIG. 5, may typically define a zigzag or sinusoidal pattern, and the "projection" referred to in the present description and in the claims is taken along the central, essentially straight portion of the scan lines.) Thus, stripes 80 and 82 emit beams along respective axes 87 and 88, which are generally parallel but in this embodiment are offset transversely relative to the projection of the scan line. The separation between the stripes, and hence the offset between the respective beams, is typically on the order of 30-50 µm, due to physical constraints of the semiconductor laser device, but larger or smaller separations are also possible.

The laser output beams from stripes 80 and 82 are collected by a microlens array 74, comprising microlenses 84, 86 that are respectively aligned with stripes 80, 82. (Alternatively, the microlenses may be formed directly on the output facet of laser die 70.) The beams then reflect from a turning mirror, such as a prism 76 with a suitably-coated diagonal face, and are collimated by a projection lens 78. Assuming lens 78 has a focal length of about 1-10 mm, the angular separation between the beams from stripes 80 and 82 in the far field (i.e., as projected onto VOI 30) will be approximately 0.1-5°. Thus, assuming receiver 48 has a collection angle of 0.5-10°, as described above, there is enough flexibility in setting the system parameters so that both illumination beams fall within the detection area of the receiver.

Figure 4:
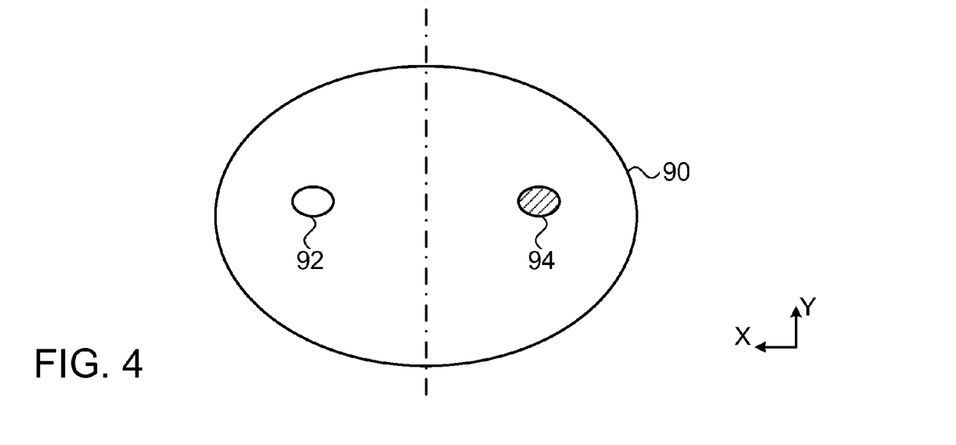
FIG. 4 is a schematic representation of the illumination and sensing areas of an optical scanning head, in accordance with an embodiment of the present invention.

FIG. 4 is a schematic representation of illumination areas 92, 94 and a sensing area 90 of optical scanning head 40, in accordance with an embodiment of the present invention. Illumination areas 92 and 94 correspond to the far-field beam profiles of the beams emitted by stripes 80 and 82 of laser die 70. As explained above, both of these areas 92 and 94 fall within a sensing area of receiver 48, at respective transverse offsets on either side of scan line 96.

Controller 42 triggers transmitter 44 so that stripes 80 and 82 are pulsed in alternation, and thus areas 92 and 94 are illuminated in alternation. The pulse timing is tuned so that there is no interference between the pulses returned from the scene due to emitters 80 and 82. As a result, at any location along scan line 96, receiver 48 will sense the light pulse reflected from either area 92 or area 94, but not both. (Alternatively, the transmitted pulse sequences of emitters 80 and 82 may be defined to be orthogonal or otherwise separable, and controller 42 may separate the received pulses by applying a suitable signal processing algorithm.) The spatial resolution of depth engine is thus a function of the sizes and separations between successive illumination areas 92 and 94.

FIG. 5 is a schematic representation of a raster scan pattern 100 formed by optical scanning head 40 using the arrangement described above, in accordance with an embodiment of the present invention. As mirror 46 scans (rapidly and resonantly in the Y-direction, and more slowly, at constant velocity in the X-direction), scan line 96 follows the zigzag raster pattern shown in the figure. (Alternatively, for simultaneous operation of both emitters, as described above, the scan pattern is just two parallel raster patterns.) Beam areas 92 and 94 scan along corresponding offset scan lines 104, 106 that are transversely displaced (in the X-direction) relative to scan line 96. As stripes 80 and 82 are pulsed in alternation, successively illuminated areas 92 and 94 are also axially displaced (in the Y-direction) relative to one another. For clarity of illustration, the horizontal spread between successive Y-direction passes of scan line 96 is exaggerated in FIG. 5, as is the vertical distance between successive illuminated areas 92 and 94; and in practice, the scan points are substantially more densely packed in both X- and Y-directions.

As a result of the beam pattern described above and shown in FIG. 5, scan pattern 100 covers the scan area with twice the density that would be achieved by using only a single emitter, i.e., the scan comprises twice as many vertical lines as it would with a single emitter, and the horizontal resolution of the scan at any given mirror scan rate and range may thus be roughly doubled. The vertical resolution is limited by the pulse rate at which laser die 70 is operated and the temporal resolution of receiver 48. Although for the sake of visual clarity, FIG. 5 shows only a small number of raster lines and a small number of illuminated areas on each line, in practice the laser die and receiver can typically operate at frequencies of 20 MHz or higher. Consequently, the vertical resolution is limited in practice by the optical and processing capabilities of depth engine 22, rather than the spot density in the vertical direction.

The simple scan pattern 100 that is shown in FIG. 5 can be enhanced in a number of ways. For example, scanner 64 may step mirror 46 in the X-direction in smaller increments, or in increments of varying size, so that scan lines 104 and 106 cover the scan area with greater density in the horizontal direction and thus enhance the horizontal resolution. Alternatively or additionally, the beam projection optics in transmitter 44 may be designed to optically reduce the angular separation between illuminated areas to 0.5° or less, thus reducing the offset between scan lines 104 and 106 and enhancing the horizontal resolution of the scan. (The angular separation may be reduced, for example, by offsetting microlenses 84 and 86 slightly relative to beam axes 87 and 88, in the manner described below with reference to FIG. 7C.)

Further alternatively or additionally, stripes 80 and 82 may be pulsed in different sorts of alternating patterns from the simple alternating toggle that is illustrated in FIG. 5. For example, stripe 80 may be pulsed two or more times in immediate succession to illuminate a group of successive areas 92 along line 104, followed by two or more successive pulses of stripe 82, and so on in alternation. The signals output by receiver 48 due to each of these groups may be averaged to form a single pixel in the resulting depth map. This technique can be particularly useful when the operating pulse frequency of laser die 70 is greater than the pixel clock rate of engine 22, in order to enhance the signal/noise ratio of the time-of-flight measurements without compromising the resolution.

As noted above, it is also possible, in an alternative embodiment, that the alternating patterns of the emitters may include simultaneous operation in orthogonal time sequences (as in certain methods that are used in communications). In such embodiments, it is not necessary to wait for the pulse to be received from the farthest point in the VOI, and pixel throughput may thus be increased significantly. This capability is especially useful in longer range sensors, where the turnaround time of flight can otherwise become the limiting factor for pixel throughput.

Figure 6:
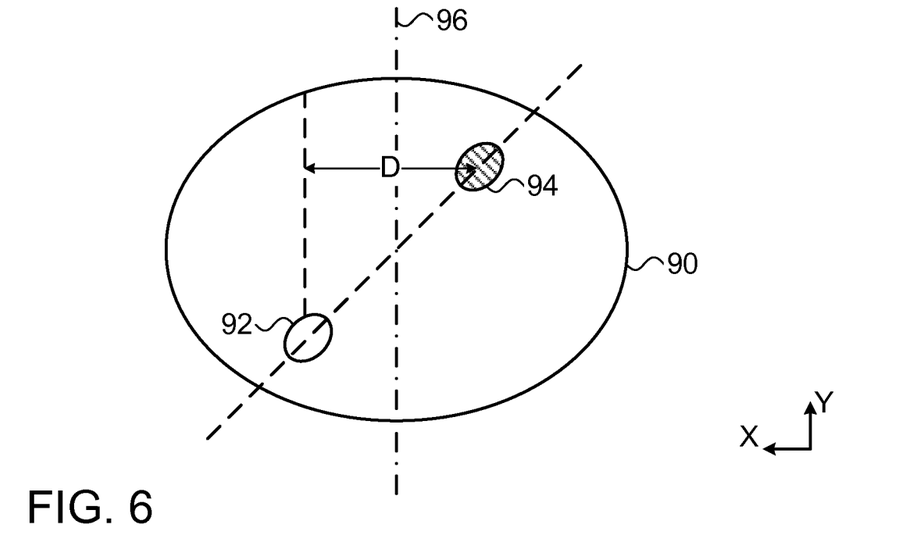
FIG. 6 is a schematic representation of the illumination and sensing areas of an optical scanning head, in accordance with another embodiment of the present invention.

FIG. 6 is a schematic representation of sensing area 90 and illumination areas 92, 94 of an optical scanning head, in accordance with another embodiment of the present invention. This figure illustrates another way to enhance the horizontal resolution of the scan pattern: The respective positions of the emitters in transmitter 44 are diagonally offset relative to the projection of scan line 96 onto substrate 72 of laser die 70. To achieve this offset, for example, substrate 72 may be rotated in the X-Y plane about the Z-axis defined by the optical axis of lens 78 (FIG. 3A). In consequence, while the actual offset between illumination areas 92 and 94 is unchanged, the effective distance D between the illumination areas in the raster scan over VOI 30 will be reduced by the cosine of the rotation angle, as shown in FIG. 6. Although the figure shows a certain angular separation between illumination areas 92 and 94, at micromirror 46 the spatial separation between the corresponding spots is very small.

Figure 7A:
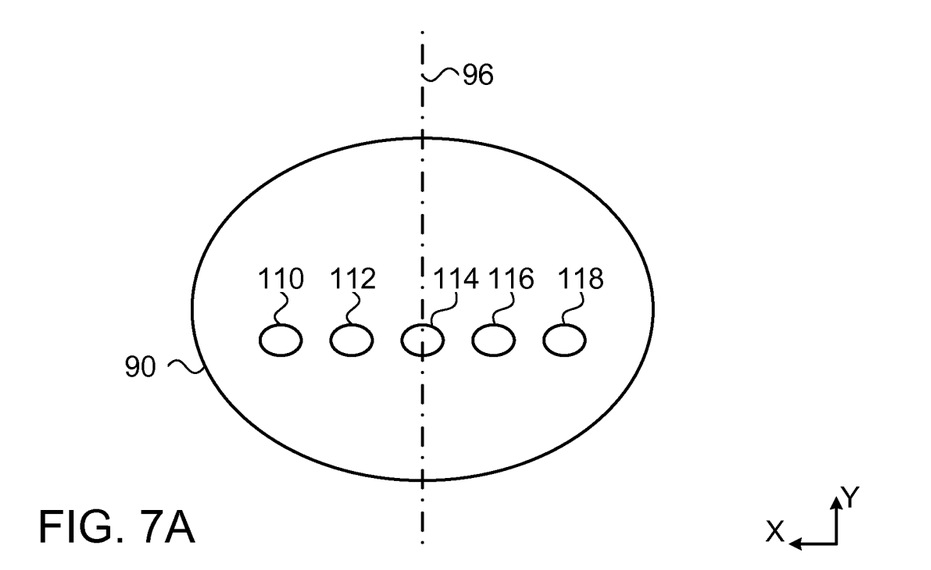
FIG. 7A is a schematic representation of the illumination and sensing areas of an optical scanning head, in accordance with yet another embodiment of the present invention.
Figure 7B:
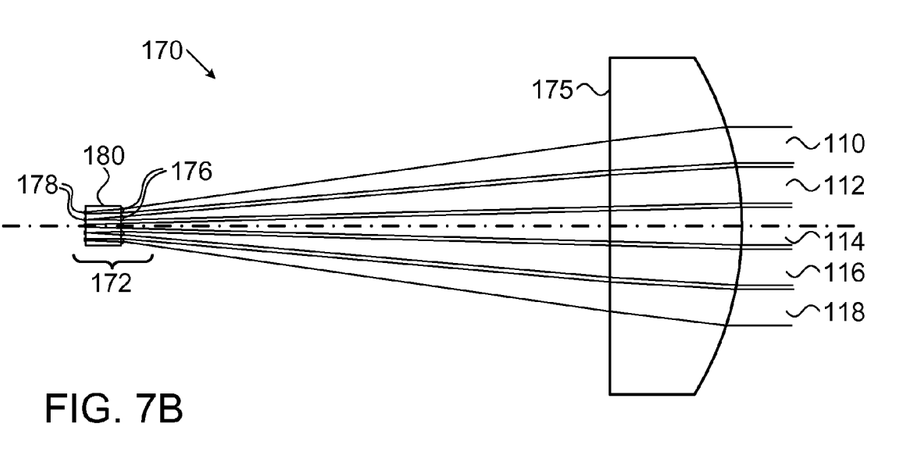
FIG. 7B is a schematic side view of a beam transmitter that can be used in producing the illumination areas of FIG. 7A, in accordance with an embodiment of the present invention.
Figure 7C:
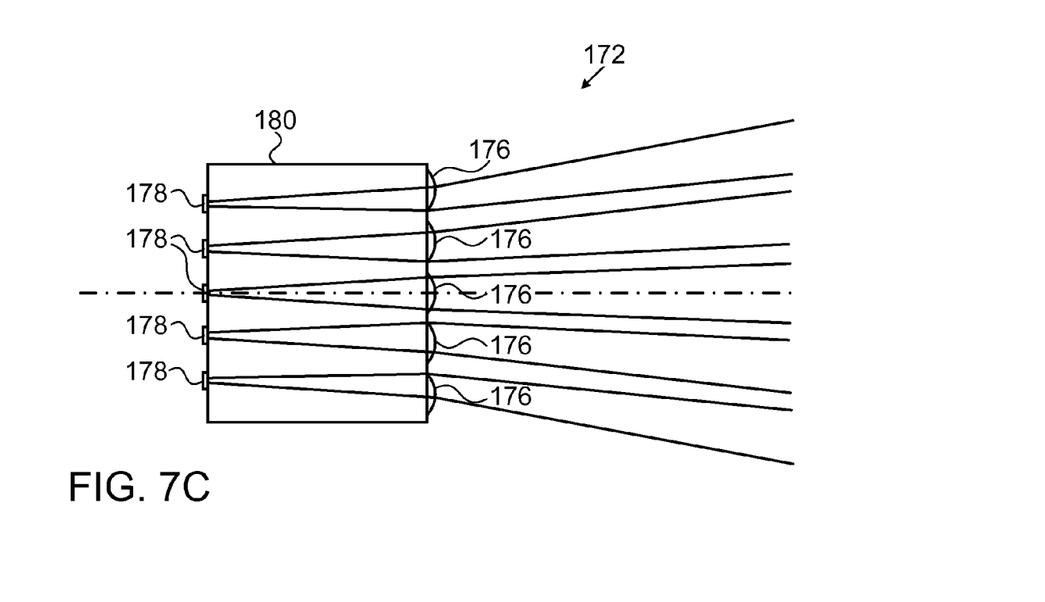
FIG. 7C is a schematic side view of a beam generator used in the transmitter of FIG. 7B, in accordance with an embodiment of the present invention.

FIG. 7A is a schematic representation of sensing area 90 and illumination areas 110, 112, 114, 116 and 118 of an optical scanning head, in accordance with yet another embodiment of the present invention. The larger number of illumination areas is achieved in this example by increasing the number of emitters in the transmitter. For this purpose, an edge-emitting laser die with a larger number of stripes may be used, or a surface-emitting device may be used as shown in FIGS. 7B and 7C. In either case, all of the emitters are pulsed in alternation, so that the depth engine scans five lines in parallel, rather than only two as in the preceding examples, and thus achieves still higher resolution. In alternative embodiments, three, four, or six or more emitters may be operated together in this manner.

Reference is now made to FIGS. 7B and 7C, which schematically illustrate a beam transmitter 170 that may be used in producing the illumination areas of FIG. 7A, in accordance with an embodiment of the present invention. FIG. 7B is a side view of the entire beam transmitter, while FIG. 7C is a side view of a beam generator 172 that may be used in transmitter 170. Transmitters of this sort and integrated optoelectronic modules based on such transmitter are described in greater detail in the above-mentioned U.S. Patent Application Publication 2013/0207970. Such transmitters and modules may be used in scanning head 40, mutatis mutandis, in place of the devices that are described above.

Beam generator 172 comprises an array of surface-emitting devices 178, such as vertical-cavity surface-emitting lasers (VCSELs). The beams emitted by devices 178 are collected by a corresponding array of microlenses 176, which direct the beams toward a collimation lens 175. Devices 178 and microlenses 176 may conveniently be formed on opposing faces of a transparent optical substrate 180, which may be a suitable semiconductor wafer, such as a GaAs wafer. As shown in FIG. 7C, the alignment between device 178 and microlenses 176 is such that the locations of devices 178 are offset inwardly relative to the centers of the corresponding microlenses 176, thus giving rise to an angular spread between the individual beams transmitted by the microlenses.

The angular spread generated by microlenses 176 defines a single virtual focus from which all of the beams reaching collimation lens 175 appear to originate. Consequently, the angular offset between adjacent beams exiting the collimation lens, which respectively form illumination areas 110, 112, 114, 116 and 118, is reduced to approximately 0.5° or less, and all of the illumination areas thus fall within detection area 90. Alternatively, devices 178 may be aligned with an outward offset relative to the corresponding microlenses 176, so that the beams transmitted by the microlenses converge to a real focus, with similar effect upon collimation.

In an alternative embodiment (not shown in the figures), the emitting devices are divided into groups, wherein each group acts as a single emitter, and the groups are aligned angularly as required for the overall performance described above.

The description above focuses on the usefulness of multi-emitter devices in enhancing scan resolution by generating multiple illumination spots at locations that are mutually offset. Additionally or alternatively, multi-emitter transmitters may be used provide redundancy in depth mapping and other such systems: In the event that one of the emitters fails, the system may still continue to operate using the other emitter(s). This approach may reduce the need for extended transmitter burn-in before deployment in the field.

Techniques similar to those described above may be used to increase the resolution of projection systems. In such systems, the eyes of the observer of the projected image act as receivers. A multi-emitter configuration of the type described above may be applied in a pico-projector to deliver HD performance using hybrid electronic-MEMS scanning capabilities.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Mapping apparatus, comprising:
   a transmitter, which is configured to emit, in alternation, at least two beams comprising pulses of light along respective beam axes that are mutually offset transversely relative to a scan line direction of a raster pattern;
   a scanner, comprising at least one rotating mirror, which is configured to rotate while the transmitter directs the at least two beams to reflect from the at least one rotating mirror so as to scan the two or more beams in the raster pattern over a scene;
   a receiver, comprising a detector which is configured to receive, via reflection from the at least one mirror, the light reflected from the scene as the at least one mirror rotates, and to generate an output indicative of a time of flight of the pulses to and from points in the scene; and
   a processor, which is coupled to process the output of the receiver so as to generate a 3D map of the scene.

2. The apparatus according to claim 1, wherein the detector has a detection area, which is scanned over the scene by the rotation of the at least one mirror, and wherein the at least two beams have respective emission areas that are scanned over the scene by the rotation of the at least one mirror and, at any given location along the raster pattern, fall within the detection area.

3. The apparatus according to claim 1, and comprising a beamsplitter, which is positioned so as to direct the beams emitted by the transmitter toward the at least one mirror, while permitting the reflected light to reach the detector, wherein the beam axes and an optical axis of the reflected light are parallel between the beamsplitter and the micromirror.

4. The apparatus according to claim 1, wherein the receiver has a detection area, which is scanned over the scene in synchronization with the at least two beams, and wherein the at least two beams have respective emission areas that at any given location along the raster pattern fall within the detection area.

5. The apparatus according to claim 1, wherein the transmitter comprises at least two emitters, which are respectively configured to emit the at least two beams and are mounted on a substrate in respective positions that are offset transversely relative to a projection of the scan line direction onto the substrate.

6. The apparatus according to claim 5, wherein the transmitter comprises an edge-emitting laser die containing an array of two or more parallel laser stripes, which serve as the at least two emitters.

7. The apparatus according to claim 5, wherein the transmitter comprises a vertically-emitting laser die containing an array of two or more vertical-cavity surface-emitting lasers (VCSELs), which serve as the at least two emitters.

8. The apparatus according to claim 5, wherein the transmitter comprises optics, comprising an array of at least two microlenses, which are respectively aligned with the at least two emitters so that the optics reduce an angular separation between the beam axes.

9. The apparatus according to claim 5, wherein the respective positions of the at least two emitters are diagonally offset relative to the projection of the scan line direction onto the substrate.

10. A method for mapping, comprising:
    emitting, in alternation, at least two beams comprising pulses of light along respective beam axes that are mutually offset transversely relative to a scan line direction of a raster pattern;
    scanning the two or more beams in the raster pattern over a scene by directing the beams to reflect from at least one mirror that rotates so as to generate the raster pattern;
    receiving the light reflected from the scene by detecting, via reflection from the at least one mirror, the light that is reflected from the scene as the mirror rotates and generating, responsively to the received light, an output indicative of a time of flight of the pulses to and from points in the scene; and
    processing the output so as to generate a 3D map of the scene.

11. The method according to claim 10, wherein detecting the light comprises collecting the light within a detection area, which is scanned over the scene by rotation of the at least one mirror, and wherein the at least two beams have respective emission areas that are scanned over the scene by the rotation of the at least one mirror and, at any given location along the raster pattern, fall within the detection area.

12. The method according to claim 10, wherein receiving the light comprises collecting the light within a detection area, which is scanned over the scene in synchronization with the at least two beams, and wherein the at least two beams have respective emission areas that at any given location along the raster pattern fall within the detection area.

13. The method according to claim 10, wherein emitting the at least two beams comprises pulsing at least two emitters to emit the at least two beams, wherein the at least two emitters are mounted on a substrate in respective positions that are offset transversely relative to a projection of the scan line direction onto the substrate.

14. The method according to claim 13, wherein the transmitter comprises an edge-emitting laser die containing an array of two or more parallel laser stripes, which serve as the at least two emitters.

15. The method according to claim 13, wherein the transmitter comprises a vertically-emitting laser die containing an array of two or more vertical-cavity surface-emitting lasers (VCSELs), which serve as the at least two emitters.

16. The method according to claim 13, wherein emitting the at least two beams comprises aligning optics, including an array of at least two microlenses, with the at least two emitters so that the optics reduce an angular separation between the beam axes.

17. The method according to claim 13, wherein emitting the at least two beams comprises positioning the at least two emitters at a diagonal offset relative to the projection of the scan line direction onto the substrate.

* * * * *